Sept. 20, 1971  H. REINSCH ET AL  3,606,529
MOTION PICTURE CAMERA WITH DISSOLVING SHUTTER
Filed Sept. 8, 1969  4 Sheets-Sheet 1

INVENTORS:
HERBERT REINSCH
ALBERT SCHNELL

BY

*Michael S. Striker*
their ATTORNEY

FIG. 3

INVENTORS:
HERBERT REINSCH
ALBERT SCHNELL

BY
their ATTORNEY

United States Patent Office
3,606,529
Patented Sept. 20, 1971

3,606,529
MOTION PICTURE CAMERA WITH
DISSOLVING SHUTTER
Herbert Reinsch, Kongen, and Albert Schnell, Stuttgart, Germany, assignors to Robert Bosch Elektronik und Photokino GmbH, Berlin and Stuttgart, Germany
Filed Sept. 8, 1969, Ser. No. 855,885
Claims priority, application Germany, Sept. 11, 1968, P 17 97 312.5
Int. Cl. G03b 21/36
U.S. Cl. 352—91    19 Claims

ABSTRACT OF THE DISCLOSURE

The knob which adjusts the dissolving shutter of a motion picture camera during fade-out and fade-in serves to start the timer mechanism which automatically terminates the fade-out and to prevent rotation of the takeup reel in the film-containing cassette in response to starting of a fade-out effect. The film which is exposed during fade-out is looped in the cassette and is thereupon transported rearwardly prior to fade-in.

BACKGROUND OF THE INVENTION

The present invention relates to photographic apparatus in general, and more particularly to improvements in motion picture cameras which are provided with dissolving shutters. Still more particularly, the invention relates to motion picture cameras embodying dissolving shutters and using motion picture film which is stored in magazines or cassettes of the type wherein the takeup reel can rotate in a single direction, namely, to collect exposed film which is drawn from the supply reel and is transported past the light-admitting window.

In motion picture cameras which employ cassettes or magazines wherein the takeup reel can rotate in a single direction, the dissolving shutter is gradually closed (to produce the fade-out effect) while the takeup reel is held against rotation so that the film which is exposed during fade-out is not collected on the takeup reel. The motor is thereupon driven in reverse so that the claw pull-down of the film transporting mechanism transports the film which was exposed during fade-out to a location upstream or ahead of the light-admitting window. The fade-in can begin as soon as the motor is ready to operate the film transporting mechanism in the normal way, i.e., so that the pull-down advances the once-exposed portion of the film past the light-admitting window.

Many motion picture cameras which comprise dissolving shutters for making of fade-out and fade-in effects are equipped with a timer mechanism which automatically arrests the motor after elapse of a given interval allotted for fade-out and after completed transport of once-exposed film in rearward direction preparatory to fade-in. The dissolving shutter is manipulated by hand during fade-in and during fade-out. The timer mechanism is desirable to automatically determine the length of that portion of film which can be exposed during fade-out and to insure that the same length of film is transported rearwardly prior to fade-in. This length is limited because the cassette cannot accommodate very long stretches of film which is not convoluted on the takeup reel and/or supply reel.

By exercising manual control over the dissolving shutter, the operator of the camera can regulate the fade-out effect during the interval which is determined by the timer mechanism, i.e., the fade-out effect can be produced during a portion of or during the entire interval, the fade-out effect can be gradual or with pronounced transitions between the illumination of successive film frames, or the fade-out effect may be gradual in part.

The quality of exposures made with conventional cameras during fade-in and fade-out depends to a considerable extent on the experience of the operator, particularly on proper timing of the operation of various units including the mechanism which blocks rotation of the takeup reel in the cassette during fade-out, the timer mechanism, and the mechanism which effects rearward transport of film prior to fade-in. As a rule, the manipulation of such mechanisms necessitates simultaneous actuation of several controls and requires a reasonable amount of skill as well as considerable concentration on the part of the user of the camera.

SUMMARY OF THE INVENTION

An object of the invention is to provide a motion picture camera, which comprises a dissolving shutter and utilizes cassettes or magazines of the type having a takeup reel rotatable in a single direction, with novel and improved controls which simplify the manipulation during fade-out, during fade-in and during the interval which precedes the fade-in.

Another object of the invention is to provide a motion picture camera with dissolving shutter wherein the member which adjusts the shutter during fade-out and fade-in can also perform other important functions in connection with making of exposures with gradual transition at the start or end of a scene.

A further object of the invention is to provide a motion picture camera wherein the initiation of the fade-out effect automatically results in starting of the timer mechanism which determines the maximum length of that portion of film which is exposed during fade-out and the length of film which is transported backwards prior to fade-in.

An additional object of the invention is to provide a novel timer mechanism for use in motion picture cameras with dissolving shutters and to provide such cameras with novel means for blocking the takeup reel in the cassette during fade-out.

Still another object of the invention is to provide a motion picture camera with dissolving shutter wherein a single adjusting member suffices to produce the fade-out and fade-in effect, to block the takeup reel in the cassette, and to start the timer mechanism.

The invention is embodied in a motion picture camera which comprises a housing serving to accommodate or to otherwise support magazines or cassettes of the type wherein unexposed motion picture film is stored on a supply member and the exposed film is normally collected by a takeup member which is rotatable in a single direction, drive means provided in the housing and operative to rotate the takeup member of an inserted cassette during normal operation of the camera and during fade-in so that the takeup member rotates in the single direction and thereby collects exposed film, a blocking mechanism movable in the housing to and from an operative position in which it blocks the operation of the drive means, a dissolving shutter adjustable in the housing to produce fade-out and fade-in effects, film transporting means including a prime mover which is installed in or on the housing and is operatively connected with the shutter and drive means, a timer mechanism provided in the housing and actuatable to arrest the prime mover means after a predetermined interval of time during fade-out and during subsequent backward transport of film in the interior of the cassette, and an operative connection provided in the housing between the shutter and the two mechanisms to actuate the timer mechanism and to move the blocking mechanism to operative position in response to adjustment of the shutter to start a fade-out effect. The shutter preferably comprises a rotary knob or an analogous adjusting member which is manipulated by hand, and the operative connection is then provided between such adjusting member and the two mechanisms. In its normal position, the adjusting member maintains the blades of the shutter in a position in which the shutter admits a maximum amount of scene light to successive film frames. The operative connection preferably comprises a spring-biased pawl or an analogous actuating member which is mounted on the adjusting member and is operative to effect actuation of the timer mechanism and to effect movement of the blocking mechanism to operative position in response to movement of the adjusting member away from its normal position, i.e., in response to start of a fade-out effect.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 6 illustrates the structure of FIG. 5 in a position upon completion of rewinding of film preparatory to fade-in.

DESCRIPTION OF THE PREFERRED EMBODIMENTS

Figure 1:
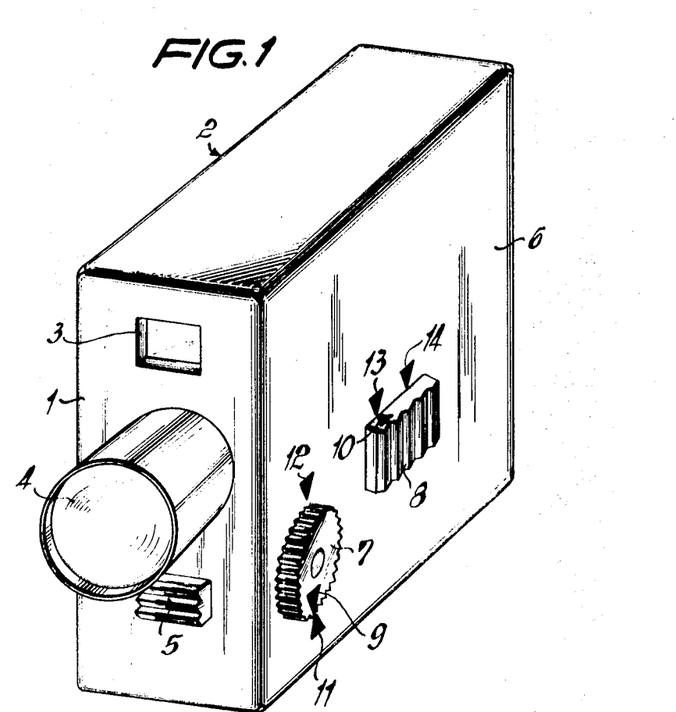
FIG. 1 is a perspective view of a motion picture camera which embodies the invention.

FIG. 1 shows a motion picture camera having a body or housing 2 whose front wall 1 is provided with a view finder window 3 and carries the mount of a picture taking objective lens 4 as well as a depressible starter knob 5. The side wall 6 of the housing 2 supports an adjusting member here shown as a rotary knob 7 which forms part of a dissolving shutter, and a shiftable knob 8 which can be actuated to effect backward transport of film subsequent to fade-out and prior to fade-in. The knobs 7 and 8 are respectively provided with indices 9, 10 which can be respectively placed into registry with markers 11, 12 and 13, 14 provided at the outer side of the wall 6.

The front portion of the housing 2 accommodates a transversely extending internal wall or partition 15 (see FIG. 2) which is provided with a light-admitting opening or window 16 located behind the objective 4. The partition 15 is generally parallel to the front wall 1 of the housing 2 and supports a rotary shaft 17 which forms part of the dissolving shutter and to which is fixed a rotary shutter blade 18. The blade 18 is provided with a suitable cutout (not shown) which travels in front of the window 16 and controls the admission of light to motion picture film an unexposed frame of which is located behind the window 16. The dissolving shutter further comprises a second blade 19 which is located behind the blade 18 and is turnable on the shaft 17 to thereby change the effective area of the cutout in the blade 18. The second blade 19 is affixed to a hollow shaft 20 which is rotatable on the shaft 17. The rear end portions of these shafts extend into a box 21 which accommodates a suitable adjusting mechanism capable of changing the angular position of the blade 19 with reference to the blade 18 to thus change the effective size of the cutout in the blade 18 between zero and a maximum value. The box 21 is mounted on the rear side of the partition 15 and the exact nature of the mechanism in this box forms no part of the present invention. It suffices to say that the angular position of the rear blade 19 with reference to the front blade 18 can be changed in response to rotation of the aforementioned adjusting knob 7 which is accessible at the outer side of the wall 6. When the index 9 of the knob 7 registers with the fixed marker 11 (normal position of the knob 7), the rear blade 19 permits a maximum amount of scene light to reach a film frame behind the window 16. The amount of such light decreases gradually in response to clockwise rotation of the adjusting knob 7 to move its index 9 from registry with the marker 11 into registry with the marker 12. When the index 9 registers with the marker 12, the rear blade 19 completely overlies the cutout of the front blade 18 so that the shutter prevents scene light from reaching the motion picture film.

Figure 2:
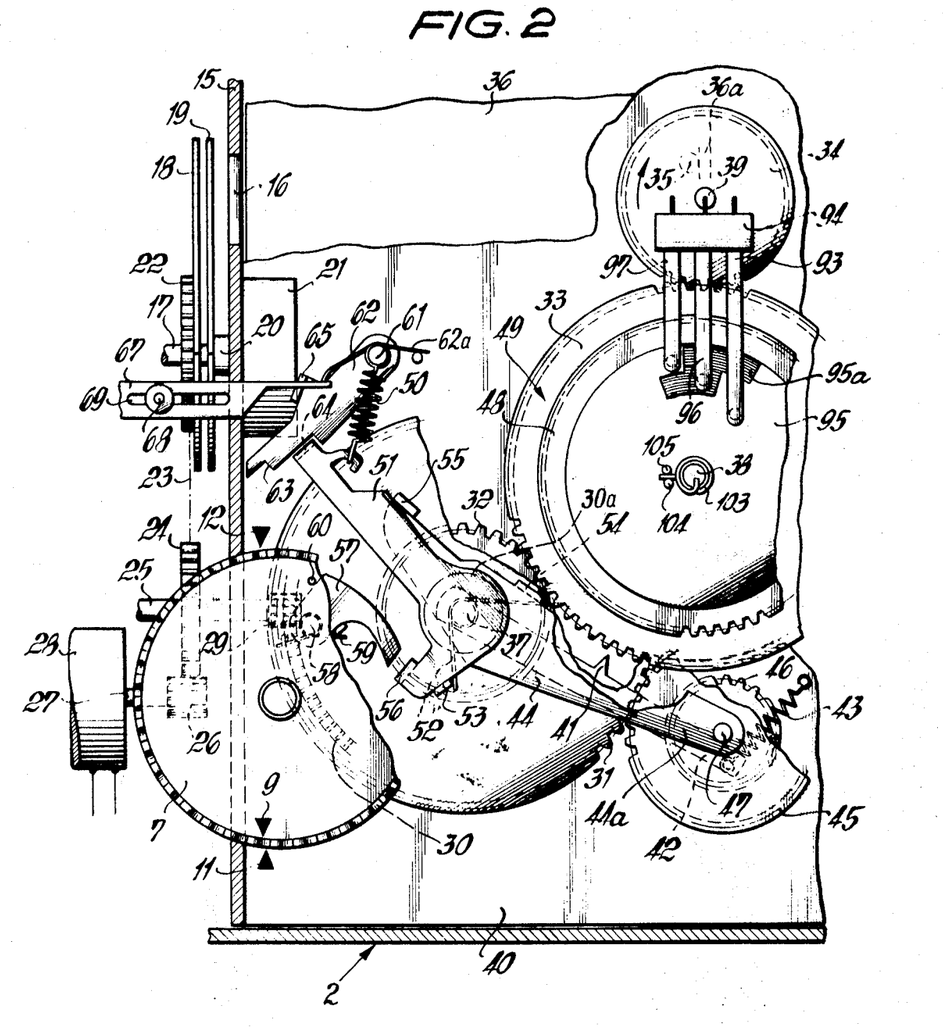
FIG. 2 is an enlarged fragmentary longitudinal vertical sectional view of the camera, showing the parts of the operative connection and the two mechanisms in positions they assume when the camera is ready to make pictures without fade-in or fade-out.

The shaft 17 of the dissolving shutter derives motion from the film transporting mechanism which includes a prime mover here shown as a reversible electric motor 28 mounted at the inner side of the front wall 1. The output shaft 27 of the motor 28 drives the shaft 17 through the intermediary of a gear train including a gear 22 on the shaft 17, an intermediate gear 24 mounted on a shaft 25, a pinion 26 provided on the output shaft 27 and meshing with the intermediate gear 24, and a power train 23 which rotates the gear 22 in response to rotation of the gear 24. The shaft 25 for the intermediate gear 24 is mounted in the wall 1 and/or partition 15, and its rear portion carries a pinion 29 which forms part of a drive for the takeup reel of an inserted magazine or cassette and mates with a ring gear 30 forming part of or rigid with a spur gear 31. The ring gear 30 can drive a smaller-diameter gear 32 which rotates a gear 34 through the intermediary of a further gear 33. The gear 34 is provided with an eccentric driving pin 35 which can rotate the spindle (not shown) of the takeup reel in the removable film-containing magazine or cassette 36. The motion receiving portion of the takeup spindle in the cassette 36 is indicated in FIG. 2 by broken lines, as at 36a. The driving pin 35 can rotate the takeup reel of the magazine 36 only in a clockwise direction as indicated by the arrow. The shafts for the gears 30–32, 33 and 34 are respectively shown at 37, 38 and 39; these shafts are journalled in a bearing plate 40 (FIGS. 2 and 3) which is mounted in the housing 2 and extends at right angles to the partition 15. The plate 40 constitutes one wall of a compartment or chamber which can accommodate the cassette 36. A friction clutch 30a is interposed between the gears 30 and 32 to permit rotation of the gear 30 when the gear 32 offers excessive resistance to rotation therewith. The aforementioned drive for the takeup reel of the cassette 36 includes the parts 29, 30, 30a and 32–35.

In order to produce a fade-in effect following completion of a fade-out effect, the camera is provided with a mechanism which can block rotation of the takeup reel in the cassette 36 during fade-out whereby that portion of film which was exposed during fade-out is not collected by the takeup reel but forms loose loops in the interior of the cassette. The blocking mechanism comprises a blocking projection or tooth 41 which can hold the gears 32–34 against rotation with the ring gear 30 while the customary claw pull-down advances the film during fade-out. The pull-down can receive motion from the pinion 26 or directly from the output shaft 27. The takeup reel of the cassette 36 cannot rotate in a rearward direction so that the film which was exposed during fade-out is loosely looped therearound. The thus exposed film is thereupon transported rearwardly by the claw pull-down and is subsequently again transported in a forward direction to be exposed during fade-in.

The aforementioned blocking tooth 41 is mounted to cooperate with the gear 33 and is provided on a one-armed blocking lever 42 which is pivotable about the axis of the shaft 37. A spring 43 is provided to bias the lever 42 in a counterclockwise direction, as viewed in FIG. 2, so that the blocking tooth 41 tends to assume the operative position of FIG. 3 in which it engages the adjoining teeth of the gear 33. A two-armed second lever 44 is also pivotable on the shaft 37 and comprises an arm 44a carrying a rotary shaft 47 rigid with two coaxial gears 45, 46. The gear 45 is in permanent mesh with the gear 31 which latter is rigid with the ring gear 30; i.e., the gear 45 is driven whenever the output shaft 27 of the motor 28 rotates. When the lever 44 is pivoted in a counterclockwise direction, as viewed in FIG. 2, the smaller gear 46 on the arm 44a is brought into mesh with a gear 48 which is rotatable on the shaft 38 of the gear 33. The gear 48 forms part of a timer mechanism 49 which will be described later; the purpose of the timer mechanism 49 is to automatically arrest the motor 28 after elapse of a predetermined interval of time subsequent to start of fade-out.

The spring 43 biases the blocking lever 42 against the shaft 47 for the gears 45, 46 on the arm 44a of the lever 44. A helical spring 50, which is stronger than the spring 43 and acts in the opposite direction, tends to pivot the levers 42, 44 in a clockwise direction, as viewed in FIG. 2, so as to normally maintain these levers in the illustrated inoperative positions. The tooth 41 of the blocking lever 42 is then remote from the teeth of the gear 33 and the gear 46 is disengaged from the timer gear 48. The spring 50 is attached to the longer arm of a bell crank lever 51 and to a pivot member 61. The lever 51 (hereinafter called switching lever) is turnable on the shaft 37 and is biased by a torsion spring 52 which reacts against the lever 44 and is convoluted around the shaft 37. One arm of the spring 52 bears against a lug 53 of the switching lever 51 and its other arm bears against a lug 54 of the lever 44. This torsion spring normally maintains an edge face on a bent-over stop 55 of the lever 44 in engagement with the longer arm of the switching lever 51.

Figure 3:
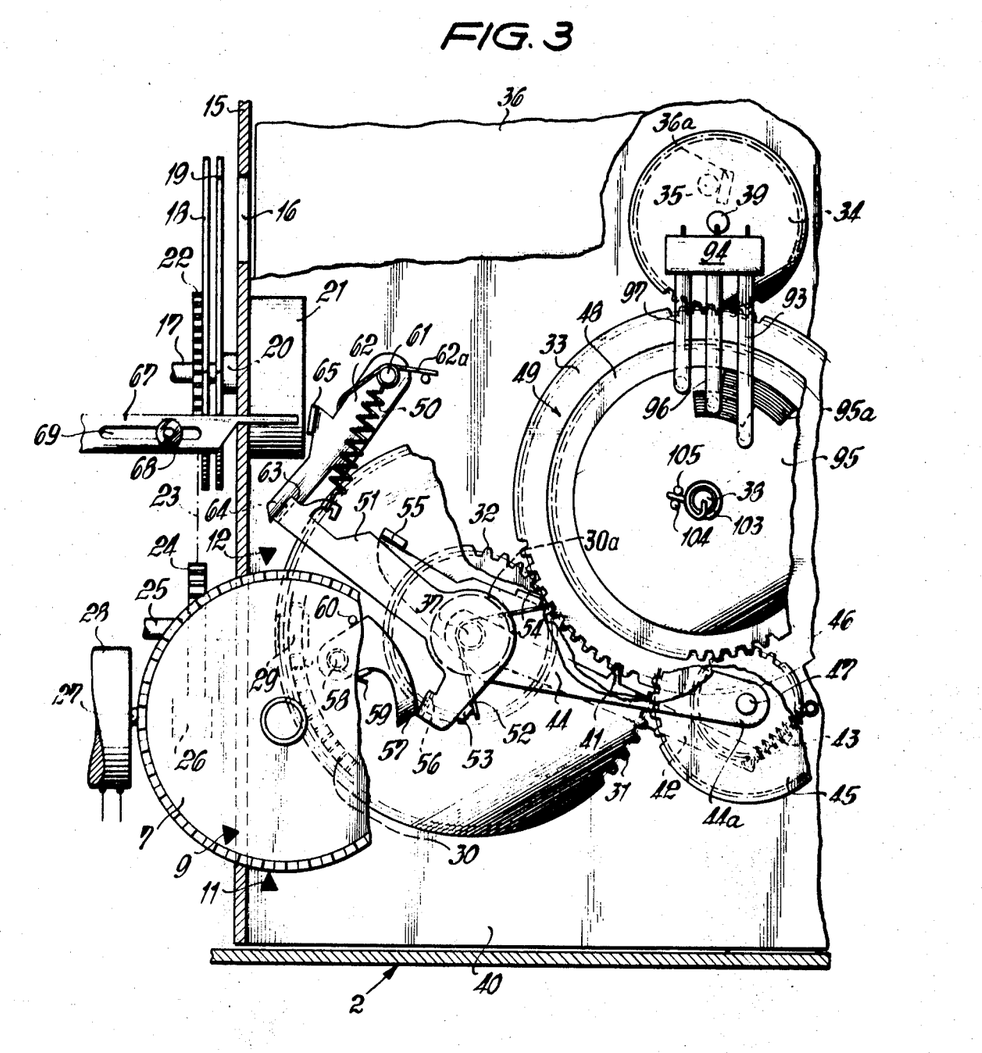
FIG. 3 is a similar fragmentary sectional view but showing the parts in positions they assume during fade-out.

In order to move the tooth 41 of the blocking lever 42 and the gear 46 to the operative positions shown in FIG. 3, the levers 42, 44 and 51 must be pivoted in a counterclockwise direction about the axis of the shaft 37. The means for pivoting these levers comprises an actuating pawl 57 which cooperates with an abutment 56 of the switching lever 51 and is turnable on an eccentric pin 58 mounted at the inner side of the adjusting knob 7. The actuating pawl 57 is biased by a torsion spring 59 so that it normally bears against a stop post 60 on the adjusting knob 7. The positions of the actuating pawl 57 and abutment 56 on the switching lever 51 are selected in such a way that the levers 42, 44 and 51 begin to pivot in a counterclockwise direction as soon as the adjusting knob 7 leaves its normal position shown in FIGS. 1 and 2 by moving the index 9 away from registry with the marker 11 and toward registry with the marker 12, i.e., these three levers begin to pivot as soon as the fade-out effect begins.

The parts 31, 44, 45, 46, 47, 50, 51, 52, 57, 59 together constitute a novel operative connection between the adjusting knob 7 of the dissolving shutter on the one hand and the timer mechanism 49 and parts 41–43 of the blocking mechanism on the other hand. This operative connection effects actuation of the timer mechanism 49 and movement of the tooth 41 on the blocking lever 42 to operative position in automatic response to movement of the adjusting knob 7 from the normal position shown in FIGS. 1 and 2. Thus, the timer mechanism 49 is started and the blocking mechanism for the drive 32, 33, 34, 35 becomes operative as soon as the operator of the camera starts to make a fade-out effect.

The bearing plate 40 supports the aforementioned pivot member 61 which serves as a retainer for one end of the helical spring 50 and as a fulcrum for an arresting pawl 62 which cooperates with a tooth or projection 64 of the switching lever 51. A torsion spring 62a biases the arresting pawl 62 in a counterclockwise direction, as viewed in FIG. 2, so that a notch 63 at the free end of the arresting pawl can receive the tooth 64 of the switching lever 51 when the latter assumes the position shown in FIG. 3, i.e., when the adjusting knob 7 is rotated to move the index 9 away from registry with the marker 11.

The arresting pawl 62 is further provided with a bent-over portion 65 which can receive motion from a suitably configured elastic claw 66 (FIG. 4a) provided at the right-hand end of a reciprocable entraining bolt 67. The latter is movable in response to actuation of the starter knob 5. The entraining bolt 67 has an elongated slot 69 which receives a guide pin 68 mounted in the housing 2, and its left-hand end is pivotally connected with a link 70 which is turnable with a shaft 71 (see FIG. 4). The shaft 71 is mounted on a bracket 72 which is secured to the front wall 1 of the housing 2. The shaft 71 is further rigidly connected to a lever 73 having a tip extending into the path of movement of the depressible starter knob 5. A helical spring 74 is provided to bias the tip of the lever 73 against a disk 75 provided at the inner end of the starter knob 5. When the knob 5 is depressed in a direction to the right, as viewed in FIG. 4, the entraining bolt 67 leaves the idle position shown in FIGS. 2 and 4 and moves in a direction to the left, i.e., counter to the direction of movement of the starter knob 5. The claw 66 of the bolt 67 then entrains the bent-over portion 65 of the arresting pawl 62 so that the latter pivots in a clockwise direction against the opposition of the torsion spring 62a until the claw 66 moves beyond (i.e., away from engagement with) the portion 65. The arresting pawl 62 is then free to pivot in a counterclockwise direction under the action of the spring 62a. When the starter knob 5 is permitted to move outwardly under the action of the spring 74, an inclined cam face 66a of the elastic claw 66 (FIG. 4a) travels over the bent-over portion 65 of the arresting pawl 62 and the other face 66b of the claw 66 then assumes the position shown in FIG. 4a in which the entraining bolt 67 is ready to again pivot the arresting pawl 62 in a clockwise direction in response to depression of the starter knob 5.

The electric circuit of the motor 28 comprises two conductors 76 and 77 (FIG. 4) which are respectively connected to fixedly mounted insulated terminals 78, 79 provided in the housing 2. The terminals 78, 79 are respectively engaged by movable contacts 80, 81 which are mounted at the inner side of the knob 8; this knob consists of electrically insulating material. The contacts 80, 81 are respectively movable into engagement with fixed contacts 82, 84 and 83, 85. The contact 82 is connected with the positive pole of a battery 87 or another suitable energy source by a conductor 86. A further conductor 88 connects the positive pole of the battery 87 with the fixed contact 85 by way of the conductor 86. The fixed contact 84 is connected by a conductor 90 with one terminal of a master switch 89 which is closed by a push rod or trip 91 in response to depression of the starter knob 5. The other terminal of the master switch 89 is connected with the contact 93 of a control switch 94 by way of a conductor 92. The contact 93 is elastic and its free end engages a current-conducting disk 95 which is affixed to the timer gear 48 and is provided with an insulating portion or section 95a.

Figures 4, 4A:
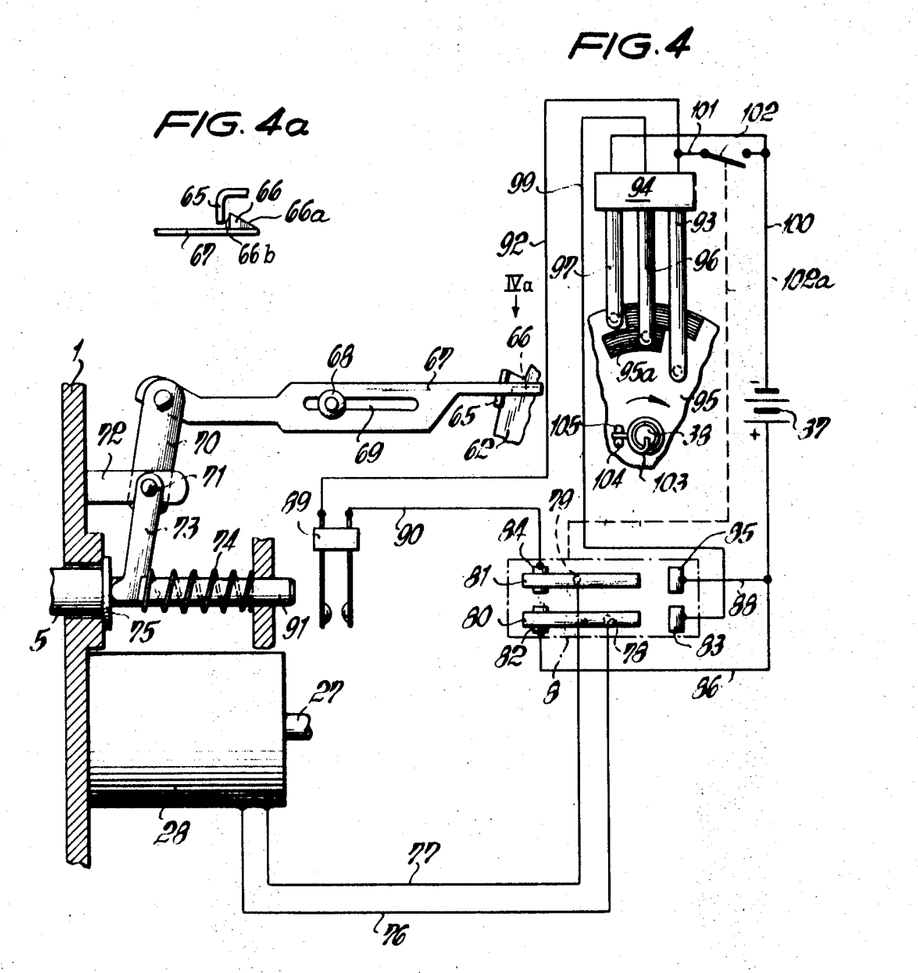
FIG. 4 illustrates certain parts of the structure shown in FIGS. 2 and 3 and the electric circuit of the prime mover and of the timer mechanism which terminates the fade-out and the backward transport of film.
FIG. 4a illustrates a detail of the camera structure as seen in the direction of arrow IVa in FIG. 4.

The control switch 94 comprises two additional elastic contacts 96, 97 whose free ends also engage the disk 95 and whose length is such that their free ends can engage the insulating section 95a in selected angular positions of the disk 95. The contact 96 is connected with the fixed contact 83 by a conductor 99, and the contact 97 is connected with the negative pole of the battery 87 by a conductor 100. A further conductor 101 which connects the conductors 92, 100 contains a switch 102 which can be closed by a linkage 102a (indicated by broken lines). The linkage 102a receives motion from the knob 8 and serves to close the switch 102 during backward transport of motion picture film.

Figure 5:
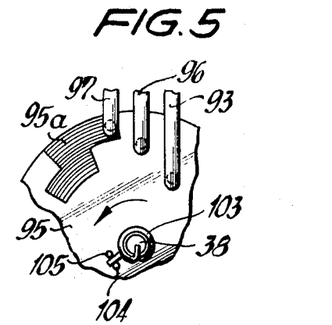
FIG. 5 illustrates a portion of the timer mechanism in the structure of FIG. 2 or 3 in a position after completion of the fade-out effect.

The knob 8 can change the polarity of the motor 28, i.e., the direction of rotation of the motor 28 is a function of the position of the knob 8 with reference to the housing 2. When the knob 8 assumes the position shown in FIGS. 1 and 4 in which its index 10 registers with the marker 13, the motor 28 is set for operation in a forward direction. When the starter knob 5 is depressed, the circuit of the motor 28 is completed from the positive pole of the battery 87, by way of the conductor 86, contacts 82, 80, terminal 78, conductor 76, windings of the motor 28, conductor 77, terminal 79, contacts 81, 84, conductor 90, master switch 89, conductor 92, contact 93, disk 95, contact 97, conductor 100, and to the negative pole of the battery 87. In order to set the motor 28 for operation in reverse, the user of the camera releases the starter knob 5 and shifts the knob 8 to the other end position in which the index 10 registers with the fixed marker 14. The movable contacts 80, 81 are then disengaged from the fixed contacts 82, 84 and respectively engage the fixed contacts 83, 85. The motor circuit is completed from the positive pole of the battery 87, through the conductors 86, 88, contacts 85, 81, terminal 79, conductor 77, the windings of the motor 28, conductor 76, terminal 78, contacts 80, 83, conductor 99, contacts 96, 93 (in a different angular position of the disk 95), conductor 101, (closed) switch 102, and conductor 100 to the negative pole of the battery 87. The position of the disk 95 at the beginning of operation of the motor 28 in reverse is shown in FIG. 5; it will be seen that the disk 95 then establishes a current-conducting connection between the contacts 93, 96 of the control switch 94 and that the contact 97 of the control switch engages the insulating section 95a.

The timer mechanism 49 further comprises a resetting spring 103 here shown as a torsion spring which is convoluted on the shaft 38 and serves to automatically return the gear 48 to the starting position of FIG. 2 as soon as the gear 46 is disengaged therefrom. One end portion of the spring 103 is fixed to the shaft 38 and its other end portion is received between two studs 104, 105 on the gear 48. In its starting position, the gear 48 holds the disk 95 in the angular position of FIG. 2 in which the disk establishes a current-conducting connection between the contacts 93, 97 of the control switch 94. The contact 96 then engages the insulating section 95a.

The operation:

To initiate normal operation of the camera, the user depresses the starter knob 5 to pivot the link 70 and the lever 73 (FIG. 4) in a counterclockwise direction so that the claw 66 of the entraining bolt 67 engages the bent-over portion 65 and turns the arresting pawl 62 in a clockwise direction. The pawl 62 is disengaged from the bolt 67 in response to relatively small clockwise rotation about the axis of the pivot 61. At the same time, the push rod 91 closes the master switch 89; this push rod is preferably rigid or integral with the starter knob 5 and serves as a guide or holder for the spring 74.

If the knob 8 dwells in the position shown in FIG. 1, the circuit of the motor 28 is completed in the aforedescribed manner and the claw pull-down transports the film in the cassette 36 in a forward direction. The output shaft 27 drives the shaft 17 of the dissolving shutter whereby the blades 18, 19 permit a maximum amount of scene light to reach successive film frames because the index 9 of the adjusting knob 7 registers with the marker 11. At the same time, the output shaft 27 of the motor 28 drives the takeup reel of the magazine 36 by way of the pinion 29, ring gear 30, clutch 30a, gears 32, 33, 34, driving pin 35 and motion receiving portion 36a. Thus, the takeup reel of the cassette 36 rotates in a forward direction and collects the film which is transported by the claw pull-down. This pull-down draws the film from the supply reel in the cassette 36; the supply reel is not driven. If the user thereupon wishes to terminate the exposure of film, the starter knob 5 is released so that the spring 74 expands and allows the master switch 89 to open. At the same time, the spring 74 pivots the lever 73 and the link 70 in a clockwise direction (back toward the positions shown in FIG. 4) so that the entraining bolt 67 moves in a direction to the right and the cam face 66a of its claw 66 slides over the bent-over portion 65 of the arresting lever 62. The left-hand contact of the master switch 89 is elastic and automatically moves away from the right-hand contact to terminate the flow of current between the conductors 90, 92 when the push rod 91 assumes the position shown in FIG. 4.

If the user wishes to produce a fade-out effect prior to completion of a series of exposures, the adjusting knob 7 is rotated slowly in a clockwise direction to move the index 9 from registry with the marker 11 toward registry with the marker 12 while the starter knob 5 remains in depressed position, i.e., while the claw pull-down transports the motion picture film in a forward direction. Rotation of the adjusting knob 7 in a clockwise direction causes the blade 19 of the dissolving shutter to move with reference to the blade 18 and to gradually reduce the amounts of scene light which can pass through the window 16 of the partition 15. The blades 18, 19 completely block entry of scene light into the window 16 when the index 9 of the adjusting knob 7 registers with the marker 12.

When the fade-out begins, the actuating pawl 57 which is mounted at the inner side of the adjusting knob 7 moves its pallet into engagement with the abutment 56 of the switching lever 51 and pivots the latter against the opposition of the spring 50 so that the lever 51 leaves the position shown in FIG. 2 and moves toward the position shown in FIG. 3. The tooth 64 of the lever 51 then enters the notch 63 of the arresting pawl 62 and the lever 51 is thereupon held in such position. At the same time, the pallet of the actuating pawl 57 is free to bypass the abutment 56 of the switching lever 51 so that the adjusting knob 7 can continue to rotate in a clockwise direction in order to complete the movement of the index 9 into registry with the marker 12. The just described counterclockwise rotation of the switching lever 51 is transmitted to the lever 44 by the torsion spring 52 so that the gear 46 on the arm 44a mates with and rotates the timer gear 48 and the disk 95. The blocking lever 42 follows the movement of the lever 44 under the action of spring 43 and moves its tooth 41 into engagement with the adjoining teeth of the gear 33. Consequently, the gears 32, 33 and 34 cease to rotate but the gear 30 continues to rotate because the gear 32 receives torque through the friction clutch 30a which permits the gears 30, 31 to rotate with reference to the gear 32 when the tooth 41 engages the gear 33. The driving pin 35 is idle and the claw pull-down merely draws film from the supply reel in the cassette 36 so that the thus withdrawn film forms loops in the interior of the cassette but is not convoluted on the takeup reel. Since the gears 30, 31 continue to rotate when the tooth 41 engages the gear 33, the gear 31 rotates the gear 45 which in turn drives the timer gear 48 through the intermediary of the shaft 47 and gear 46. The gear 48 and the disk 95 rotate in a clockwise direction, as viewed in FIG. 3. The film which is being drawn by the claw pull-down during blocking of rotation of the gears 32–34 is transported past the window 16 so that its frames are exposed to scene light during fade-out until the index 9 moves into registry with the marker 12.

When the timer gear 48 completes a clockwise angular movement through about 340 degrees, the insulating section 95a of the disk 95 assumes the position shown in FIG. 5 in which the disk establishes a current-conducting connection between the elastic contacts 93, 96 of the control switch 94 but the tip of the contact 97 engages the section 95a. This automatically interrupts the motor circuit so that the motor comes to a standstill.

The operator thereupon releases the starter knob 5 so that the master switch 89 opens. The entraining bolt 67 returns to the position shown in FIG. 2 under the action of the helical spring 74 whereby the claw 66 of the bolt reengages the portion 65 of the arresting pawl 62 without changing its angular position. This is due to the fact that the claw 66 is elastic and is provided with the aforementioned cam face 66a.

In the next step, the operator shifts the knob 8 so as to move the index 10 into registry with the marker 14. The arresting pawl 62 continues to hold the switching lever 51 in the position of FIG. 3 in which the tooth 41 of the blocking lever 42 holds the gears 32–34 against rotation with the gears 30, 31. As explained above, the movable contacts 80, 81 leave the fixed contacts 82, 84 and engage the fixed contacts 83, 85 in automatic response to movement of the knob 8 in a direction to place the index 10 into registry with the marker 14. At the same time, the knob 8 causes the linkage 102a to close the switch 102 in the conductor 101. The motor circuit is completed in the aforedescribed manner whereby the claw pull-down transports the film rearwardly while the blades 18, 19 of the dissolving shutter block the entry of scene light into the window 16. The driving pin 35 is idle because the gears 32–34 are held against rotation with the gears 30, 31 by the tooth 41 of the blocking lever 42. However, the gear 31 rotates the gears 45, 46 in a clockwise direction so that the gear 48 and disk 95 rotate in a counterclockwise direction. Since the takeup reel in the cassette 36 is idle, the claw pull-down merely shifts the film portion which was exposed during fade-out in the interior of the cassette toward the supply reel.

Figure 6:
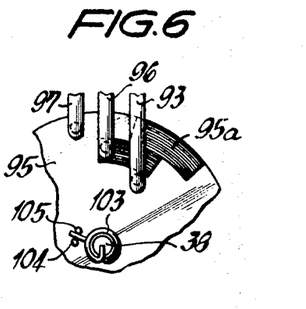

The direction in which the disk 95 is rotated during backward transport of motion picture film is indicated by the arrow shown in FIG. 5. Such rotation is terminated automatically when the disk 95 reaches the position shown in FIG. 6 in which the median contact 96 of the control switch 94 engages the insulating section 95a. This interrupts the circuit of the motor 28 so that the output shaft 27 ceases to rotate and the claw pull-down is arrested together with the shutter blades 18, 19. The arrangement is preferably such that the knob 8 is biased to the position of FIG. 1 by a suitable spring or the like so that the index 10 automatically returns into registry with the marker 13 when the knob 8 is released. The starter knob 5 is thereupon depressed again so that the disk 75 causes the entraining bolt 67 to move in a direction to the left, as viewed in FIG. 2, and to again disengage the arresting pawl 62 from the switching lever 51. The claw 66 can pivot the arresting lever 62 against the opposition of the torsion spring 62a to such an extent that the notch 63 moves away from the tooth 64 of the switching lever 51 whereby the spring 50 is free to contract and to return the lever 51 to the position shown in FIG. 2. The switching lever 51 engages thereby the stop 55 of the lever 44 and turns the latter in the same direction whereby the gear 46 moves away from the gear 48 and the shaft 47 on the arm 44a causes the blocking lever 42 to stress the spring 43 and to move the tooth 41 away from engagement with the gear 33. The resetting spring 103 then returns the gear 48 and disk 95 to the positions shown in FIG. 2, i.e., the disk 95 rotates clockwise from the position of FIG. 6 back to the position shown in FIG. 2 or 4. The operator begins to turn the adjusting knob 7 in a counterclockwise direction as soon as the starter knob 5 is depressed whereby the index 9 travels gradually from the marker 12 toward the marker 11 and the mechanism in the box 21 gradually turns the rear blade 19 with reference to the front blade 18 so that the fade-in effect takes place and is terminated preferably after an interval of time which is the same as the one required for the fade-out effect. The driving pin 35 is rotated by the gear 34 because the tooth 41 of the blocking lever 42 is disengaged from the gear 33 so that the friction clutch 30a is effective and rotates the gear 32. Therefore, the film which is exposed during fade-in is convoluted on the takeup reel of the casette 46. Thus, the loose loops of film in the interior of the cassette 36 disappear when the fade-in effect is completed whereupon the camera operates in the customary way and exposes successive film frames to light which enters by way of the window 16 in fully open position of the dissolving shutter, i.e., the blade 19 does not interfere with passage of scene light through the cutout of the front blade 18 when the index 9 of the adjusting knob 7 returns into registry with the marker 11. As a rule, the takeup reel in the cassette 36 tends to rotate at a speed which exceeds the speed of film transport by the claw pull-down; this is desirable to insure that the film in the cassette is maintained under a certain tension.

An important advantage of the improved camera is that the adjusting knob 7 of the dissolving shutter automatically effects movement of the tooth 41 on the blocking lever 42 to operative position and automatically actuates the timer mechanism 49 when it is caused to leave its normal position in which the index 9 registers with the marker 11, i.e., in response to start of a fade-out effect. In this way, the operator of the camera can concentrate on the scene which is to be photographed and can start a fade-out effect by simply holding the starter knob 5 in depressed position and by rotating the adjusting knob 7 from the normal position shown in FIG. 1. Thus, even an unskilled amateur can make satisfactory exposures with fade-out and fade-in effects without lengthy experimentation. The advantages of the multiple-purpose adjusting knob 7 will be readily appreciated by considering that the fade-out effect begins when the camera is in operation, i.e., when the user must press on the starter knob 5 and must also observe the scene by looking through the view finder window 3.

The springs 43, 50 and 52 insure that the switching lever 51 can transmit motion to the levers 42 and 44 as well as that these levers can pivot through different angles.

A film magazine of the type described, wherein the takeup reel can rotate only in a single direction is disclosed, for example, in German Pat. No. 1,234,519.

Details of a dissolving shutter having a front blade and a rear blade, the angular position of which can be changed in response to rotation of an adjusting member are shown for example in U.S.A. Pat. No. 1,362,199.

U.S.A. Pat. No. 2,702,491 discloses a pull-down capable of being used in the camera of the present invention.

Without further analysis, the foregoing will so fully reveal the gist of the present invention that others can, by applying current knowledge, readily adapt it for various applications without omitting features which fairly constitute essential characteristics of the generic and specific aspects of our contribution in the art.

What is claimed as new and desired to be protected by Letters Patent is set forth in the appended claims:

1. In a motion picture camera, a combination comprising a housing arranged to accommodate cassettes of the type wherein unexposed motion picture film is stored on a supply member and the exposed film is normally collected by a takeup member which is rotatable in a single direction; drive means provided in said housing and operative to rotate the takeup member of an inserted cassette in said direction to thereby collect exposed film thereon; a blocking mechanism movable in said housing to and from an operative position in which it blocks operation of said drive means; a dissolving shutter adjustable in said housing to produce fade-out and fade-in effects; film transporting means including prime mover means provided in said housing and operatively connected with said drive means and said shutter; a timer mechanism provided in said housing and actuatable to arrest said prime mover means after a predetermined interval of time; and an operative connection provided in said housing between said shutter and said timer and blocking mechanisms to actuate said timer mechanism and to move said blocking mechanism to operative position in response to adjustment of said shutter to start a fade-out effect.

2. A combination as defined in claim 1, wherein said shutter comprises an adjusting member and said operative connection is provided between said adjusting member and said timer and blocking mechanisms.

3. A combination as defined in claim 2, wherein said adjusting member is movable to and from a normal position in which said shutter admits a maximum amount of scene light and said operative connection comprises an actuating member provided in said adjusting member and operative to effect actuation of said timer mechanism and to effect movement of said blocking mechanism to operative position in response to movement of said adjusting member away from said normal position.

4. A combination as defined in claim 3, wherein said actuating member is a spring-biased pawl which is pivotally secured to said adjusting member.

5. A combination as defined in claim 3, wherein said operative connection further comprises a movable switching member which effects actuation of said timer mechanism and movement of said blocking mechanism to operative position in response to displacement by said actuating member on movement of said adjusting member away from normal position.

6. A combination as defined in claim 5, wherein said switching member is a lever which is pivotable with reference to said housing.

7. A combination as defined in claim 5, wherein said blocking mechanism comprises a blocking member which is movable into blocking engagement with said drive means and is held by said switching member against such movement in normal position of said adjusting member.

8. A combination as defined in claim 7, wherein said drive means comprises a rotary gear and said blocking member is a lever having a portion which engages and holds said gear against rotation in response to movement of said adjusting member from said normal position.

9. A combination as defined in claim 5, wherein said timer mechanism comprises a rotary gear and said operative connection further comprises additional gear means driven by said prime mover and movable by said switching member into torque-transmitting engagement with said first mentioned gear in response to movement of said adjusting member from normal position.

10. A combination as defined in claim 9, wherein said operative connection further comprises a lever receiving motion from said switching member and supporting said additional gear means.

11. A combination as defined in claim 5, wherein said switching member is a lever which is pivotable about a fixed axis and said operative connection further comprises a second lever receiving motion from said first mentioned lever and pivotable about said axis, said blocking mechanism comprising a third lever pivotable about said axis and receiving motion from one of said first mentioned levers, said second lever being arranged to effect actuation of said timer mechanism and said third lever being arranged to effect blockage of said drive means in response to movement of said first mentioned lever on movement of said adjusting member from normal position.

12. A combination as defined in claim 11, wherein said drive means comprises a first gear rotatable about said axis and receiving torque from said prime mover means, a second gear coaxial with said first gear and arranged to rotate the takeup member in said direction, and friction clutch means interposed between said gears to normally rotate said second gear in response to rotation of said first gear, said third lever comprising means for preventing rotation of said second gear with said first gear in response to movement of said adjusting member from normal position.

13. A combination as defined in claim 12, wherein the diameter of said first gear exceeds the diameter of said second gear and wherein said timer mechanism comprises a third rotary gear, said operative connection further comprising additional gear means provided on said second lever and arranged to establish a driving connection between said first and third gears in response to movement of said adjusting member from normal position.

14. A combination as defined in claim 5, wherein said switching member comprises a first lever which is pivotably mounted in said housing and is movable by said actuating member from a first to a second position in response to movement of said adjusting member away from normal position, said operative connection further comprising a second lever arranged to effect actuation of said timer mechanism in response to pivoting of said first lever on movement of said adjusting member from normal position and said blocking mechanism comprising a third lever arranged to assume said operative position in response to such pivoting of said first lever.

15. A combination as defined in claim 14, wherein said operative connection further comprises first resilient means for permanently urging said third lever to said operative position and second resilient means for holding said second and third levers in motion receiving engagement with said first lever.

16. A combination as defined in claim 15, further comprising third resilient means opposing pivotal movement of said first lever and arranged to oppose movement of said third lever to operative position under the action of said first resilient means.

17. A combination as defined in claim 5, further comprising starter means actuatable to start said prime mover means and arresting means receiving motion from said starter means to hold said switching member in a position said switching member assumes in response to movement of said adjusting member from normal position until renewed actuation of said starter means.

18. A combination as defined in claim 17, further comprising an entraining member receiving motion from said starter means to disengage said arresting means from said switching member in response to actuation of said starter means.

19. A combination as defined in claim 18, wherein said arresting means comprises a projecting portion and said entraining member comprises a claw having a cam face which travels over said projecting portion in response to termination of actuation of said starter means, said claw being arranged to move said arresting means away from engagement with said switching member on renewed actuation of said starter means.

References Cited

UNITED STATES PATENTS

| | | | |
|---|---|---|---|
| 2,319,204 | 5/1943 | Bolsey | 352—91 |
| 2,376,300 | 5/1945 | Widmer | 352—217 |
| 3,246,944 | 4/1966 | Winkler | 352—91 |
| 3,494,691 | 2/1970 | Katsuyama | 352—91X |
| 3,514,197 | 5/1970 | Sho | 352—91 |

LOUIS R. PRINCE, Primary Examiner

J. W. ROSKOS, Assistant Examiner

U.S. Cl. X.R.

352—217

UNITED STATES PATENT OFFICE
CERTIFICATE OF CORRECTION

Patent No. 3,606,529　　　　　Dated September 20, 1971

Inventor(s) Herbert Reinsch, et al

It is certified that error appears in the above-identified patent and that said Letters Patent are hereby corrected as shown below:

In the heading to the printed specification, lines 5 and 6, "assignors to Robert Bosch Elektronik Und Photokino GmbH, Berlin and Stuggart, Germany", should read -- Robert Bosch Photokino GMBH Stuttgart-Unterturkheim, Germany --.

Signed and sealed this 10th day of October 1972.

(SEAL)
Attest:

EDWARD M.FLETCHER,JR.　　　　　　　　ROBERT GOTTSCHALK
Attesting Officer　　　　　　　　　　Commissioner of Patents